METHODS AND MEANS FOR LOW TEMPERATURE SEPARATION

Original Filed July 25, 1958 4 Sheets-Sheet 1

INVENTORS
Joy P. Walker
Robert W. Coggins
BY Ashley & Ashley
ATTORNEYS

METHODS AND MEANS FOR LOW TEMPERATURE SEPARATION

Original Filed July 25, 1958 4 Sheets-Sheet 2

INVENTORS
Jay P. Walker
Robert W. Coggins
BY Ishley & Ishley
ATTORNEYS

METHODS AND MEANS FOR LOW TEMPERATURE SEPARATION

Original Filed July 25, 1958 4 Sheets-Sheet 3

INVENTORS
Jay P. Walker
Robert W. Coggins
BY Shley & Shley
ATTORNEYS

METHODS AND MEANS FOR LOW TEMPERATURE SEPARATION

Original Filed July 25, 1958 4 Sheets-Sheet 4

INVENTORS
Jay P. Walker
Robert W. Coggins
BY Shley & Shley
ATTORNEYS

United States Patent Office

Re. 25,759
Reissued Apr. 6, 1965

25,759

METHODS AND MEANS FOR LOW TEMPERATURE SEPARATION

Jay P. Walker and Robert W. Coggins, Tulsa, Okla., assignors to National Tank Company, Tulsa, Okla., a corporation of Nevada Original No. 3,012,629, dated Dec. 12, 1961, Ser. No. 751,069, July 25, 1958. Application for reissue June 19, 1963, Ser. No. 290,280
16 Claims. (Cl. 55—57)

Figures 1, 2, 5:
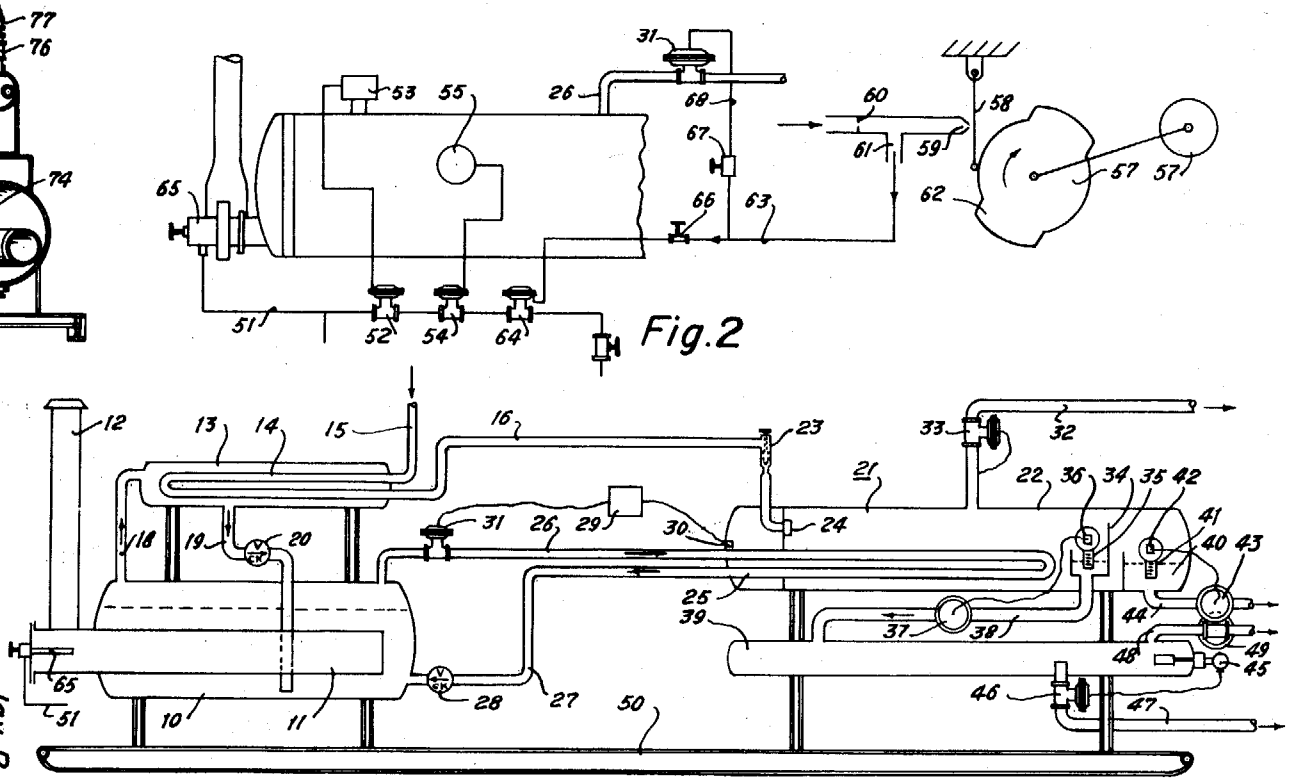

Matter enclosed in heavy brackets [ ] appears in the original patent but forms no part of this reissue specification; matter printed in italics indicates the additions made by reissue.

This invention relates to new and useful improvements in methods and means for low temperature separation.

The invention is particularly directed toward the field of low temperature separation of distillate and water from relatively high pressure well streams of the type in which a considerable or a major portion of the recoverable hydrocarbons may be present in the gaseous phase. Such recovery units normally involve a low temperature separation vessel into which the well stream is expanded through a choke, or other pressure reducing means, for temperature reduction and condensation or liquefaction of the valuable light hydrocarbons, as well as the liquefaction of water which may be present in the vapor phase and which must be removed from the gaseous portion of the well stream prior to introduction of the latter into a gas transmission pipe line.

Low temperature separation units customarily include means for heating a portion or all of the separated liquids in order to melt any ice or gas hydrates which may be present, and it has been the practice to pass the incoming well stream through heating coils in the lower portion of the low temperature separation unit for supplying the necessary heat. Such a system often entails, however, the addition of heat to the well stream prior to its passage through the heating coils, and due to the heat transfer conditions which necessarily ensue, the well stream must be heated to temperatures well above those temperatures desired in the liquids in the lower portion of the low temperature separation unit.

Under some conditions, the well stream may need some degree of heating prior to its passage through the choke or other pressure reduction means in order to make certain that the well stream will be above the point of gas hydrate formation prior to entering the choke so that all hydrates are formed downstream of the choke. When, however, the well stream is heated for the purpose of supplying heat to the lower portion of the low temperature separation unit, it is often necessary to heat the stream well above that temperature necessary to ensure the absence of gas hydrates prior to expansion of the well stream. Accordingly, the entire system is thus operated at a higher temperature than that required, and the recovery of the desired portions of salable hydrocarbons is consequently reduced or prevented.

It is also a common practice to supply heat constantly or at a constant rate to the lower portion of the low temperature separation unit, both for the reason that such continuous heating is often or usually necessary in order to melt all of the hydrates which may be formed, as well as to overcome the inherent difficulties in achieving adequate heat transfer from a predominantly gaseous well stream to a body of liquid through heat exchange or heater coils. Here again, there is often a wasteful heating of the well stream, large quantities of gas are required for continuously effecting such heating, and the well stream enters the choke at higher than necessary temperatures.

It is, therefore, one object of this invention to provide improved methods and means of low temperature separation in which the heat of steam is employed for heating the low portion of the low temperature separation unit, both to obtain very effective heat transfer and utilization of the heat supplied through the steam, as well as to provide for whatever heating of the well stream may be necessary to prevent the formation of gas hydrates upstream of the pressure reducing choke and/or to control the composition of the gas leaving the low temperature unit.

A further object of the invention is to provide improved methods and means for low temperature separation particularly adapted to utilization with well streams flowing at fairly low rates, or well streams of moderate pressure in which a limited pressure reduction step is available, or well streams of modest liquid volumes in which steam is utilized for heating purposes in order that the relatively small volumes of well fluids need not be heated to excessive temperatures for the purpose of supplying heat to the low temperature separation unit, as well as to ensure operation of the unit at the lowest possible temperatures in order that full advantage may be taken of whatever pressure drops are available.

An additional object of the invention is to provide improved methods and means for low temperature separation particularly adapted to utilization in instances in which it may be desired to vary the flowing volumes of well streams rapidly over wide ranges.

Yet another object of the invention is to provide improved methods and means for low temperature separation wherein all necessary or required heating is carried out by steam which may be utilized at intervals or on a time-controlled basis so that the heating of the low temperature separation unit is not continuous but is supplied only at intervals and with high effectiveness to melt or decompose any gas hydrates which may have accumulated in the low temperature separation unit, resulting in an overall operation of the low temperature unit at minimum temperatures for maximum dehydration of the well stream and maximum hydrocarbon recovery.

An additional object of the invention is to provide improved methods and means for low temperature separation in which a source of steam is employed on a controlled basis for supplying heat to the low temperature separation unit, and on a separately controlled basis for supplying heat to the incoming well stream prior to its passage through the pressure reducing choke for preventing the formation of gas hydrates upstream of said choke and/or to predetermine the hydrocarbon composition of the gas flowing from the unit.

Yet a further object of the invention is to provide improved methods and means for low temperature separation wherein the incoming well stream may be heated to any necessary or desired degree to produce an outlet gas of desired or selected hydrocarbon composition.

A further object of the invention is to provide improved low temperature separation means having steam heating coils in which the possibility of freezing of water in the coils, with consequent possible damage to or rupture of the coils, is avoided.

Other and more particular objects will be apparent from a reading of the following specification and claims.

A construction designed to carry out the invention will be hereinafter described, together with other features of the invention.

The invention will be more readily understood from a reading of the following specification and by reference to the accompanying drawings, wherein examples of the invention are shown, and wherein:

FIG. 1 is a diagrammatic view illustrating a low temperature separation unit constructed in accordance with this invention and adapted to carry out the methods hereof, FIG. 2 is a schematic view showing the means for controlling the intermittent heating of the low temperature separator.

Figure 4:
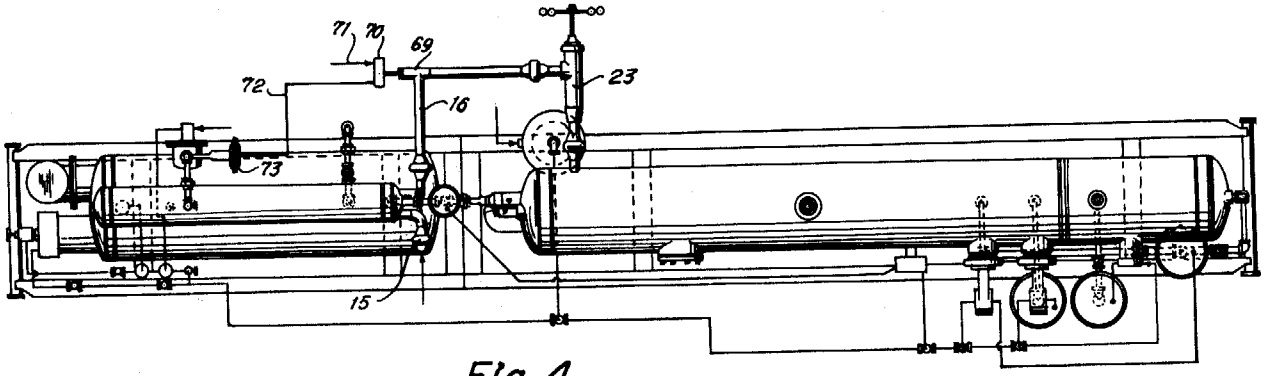
Figure 3:
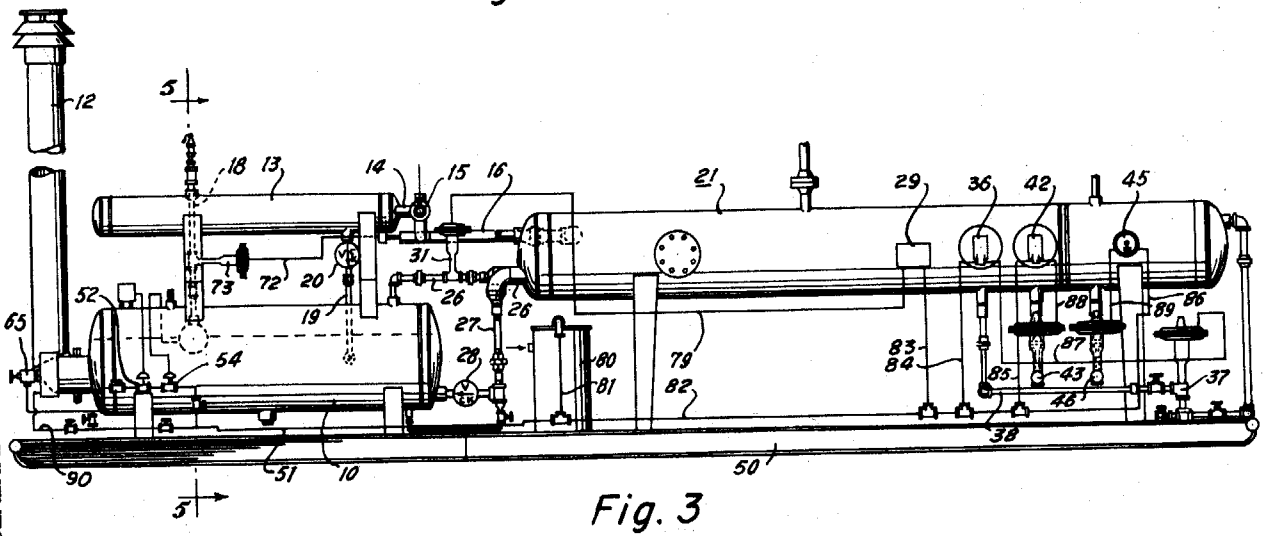
Figure 6:
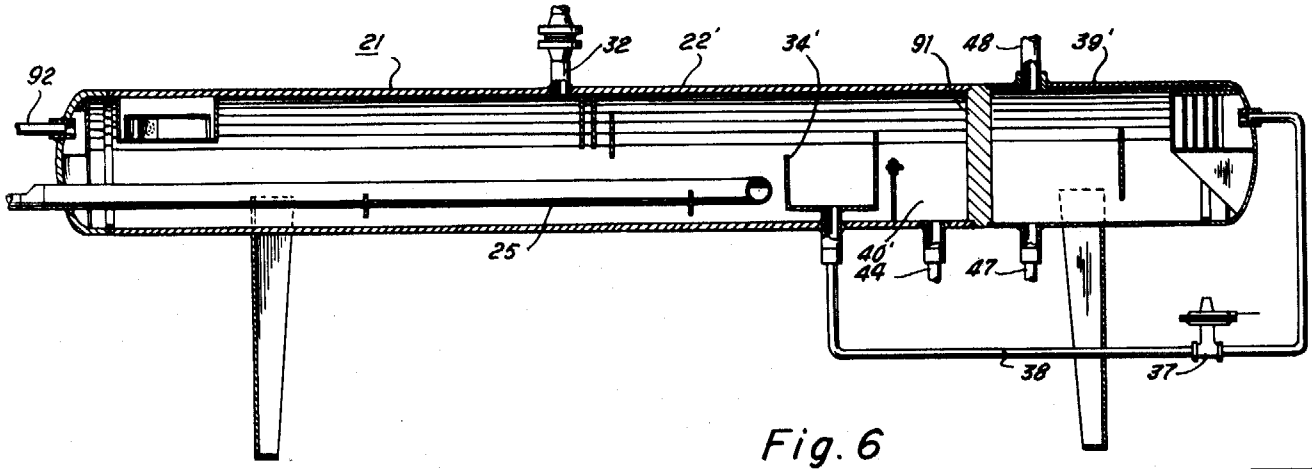
Figure 7:
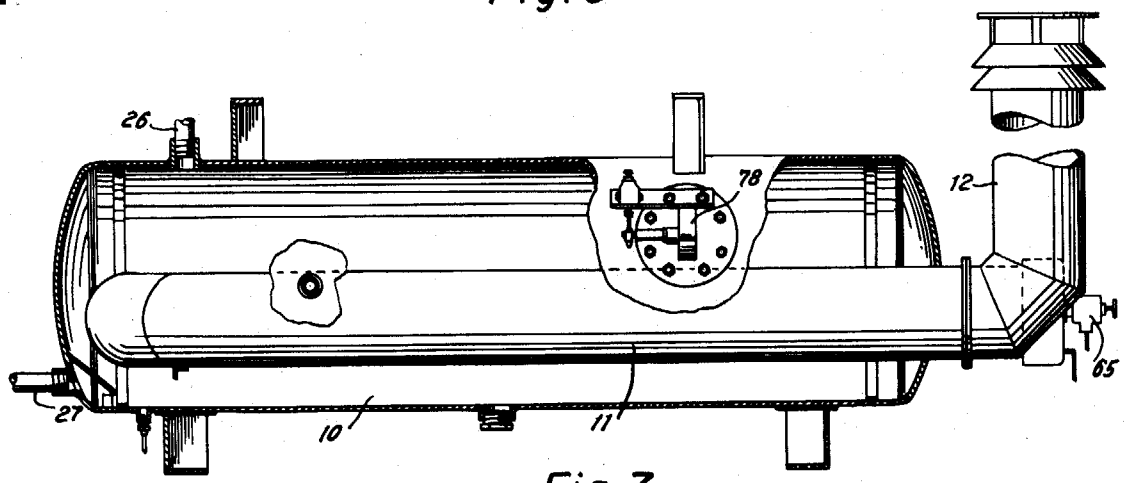
Figure 8:
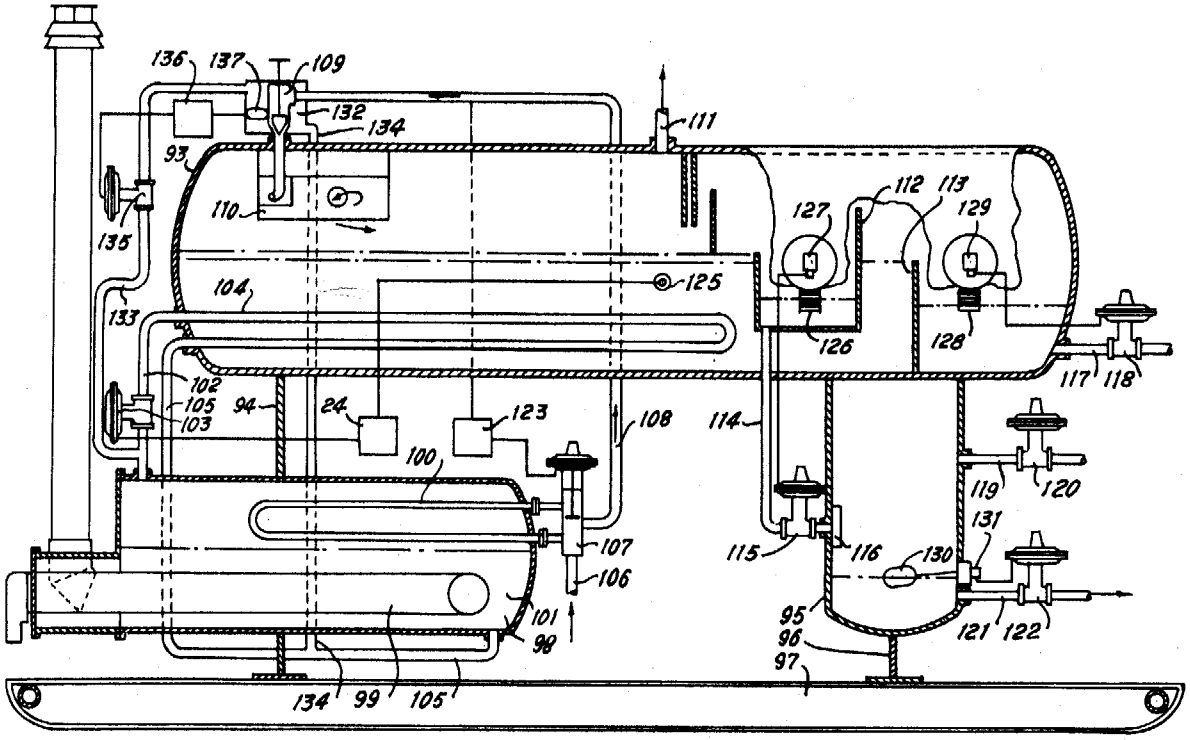

FIG. 3 is a side elevational view illustrating the low temperature separator in greater detail, FIG. 4 is a plan view of the unit shown in FIG. 3, FIG. 5 is a vertical, transverse, sectional view taken upon the line 5—5 of FIG. 3, FIG. 6 is a vertical, longitudinal, sectional view of the low temperature separator, FIG. 7 is a vertical, longitudinal, sectional view of the low pressure steam generator, and FIG. 8 is a diagrammatic view illustrating a still further modification of the invention.

Turning now to FIG. 1 of the drawings, the numeral 10 designates a steam generation vessel of the type which may operate on automatic controls unattended by operating personnel. A fire tube or other heating means 11 extends into the vessel for supplying heat thereto, the fire tube having a flue or vent 12 and being adapted for supplying heat to the interior of the vessel 10 for the generation of steam, as an example steam supplied under a pressure of the magnitude of 15 pounds per square inch or under higher or lower pressures. A well stream preheater 13 is associated with the steam generator and encloses a set of preheat coils 14 having a well stream inlet conductor 15 connected thereto and a well stream outlet conductor 16 leading therefrom. A steam conductor 18 leads from the upper portion of the steam generator 10 into the enclosure 13, and a condensate drain pipe 19 leads from the lower portion of the enclosure 13 through a check valve 20 into the lower portion of the steam generator 10, or at least, a point below the normal operating water level therein. As pointed out hereinafter, suitable temperature or pressure control means may be incorporated in the steam supply conductor 18 for controlling the degree of heating of the well stream in the coils 14 in order that the well stream may be maintained at a level just above the point of gas hydrate formation prior to pressure reduction of the well stream and/or in order that the composition of the gas leaving the low temperature unit may be varied or controlled.

A low temperature separation unit 21 is associated with the steam generator 10, the low temperature separator desirably comprising an elongate horizontal vessel 22 into which the well stream conductor 16 opens through a choke or other pressure reducing means 23 and a diverter 24. A set of heating coils 25 is disposed in the lower portion of the vessel 22 with their lowest point above the steam generator 10 and has connected thereto a steam inlet conductor 26 leading from the upper portion of the steam generator and a condensate return conductor 27 connected into the lower portion of the steam generator through a check valve 28. A temperature controller 29 senses the heating of the lower portion of the vessel 22 through a temperature bulb 30 and controls a motor valve 31 in the steam inlet conductor 26 for maintaining the desired degree or level of heating within the vessel 22.

A gas outlet conductor 32 leads from the upper portion of the vessel 22 through a back pressure valve 33 for withdrawing separated gas from the low temperature separator, and a distillate or liquid hydrocarbons overflow sump 34 positioned near the end of the vessel 22 opposite the inlet diverter 24 is provided with a float 35 and a float control unit 36 for operating a diaphragm valve 37 positioned in a distillate outlet conductor 38 extending from the sump 34 to a low pressure separator 39. A water overflow sump 40 is provided in the vessel adjacent the sump 34 and encloses a float 41 operating a control unit 42 which controls the opening and closing of a diaphragm valve 43 provided in a water outlet conductor 44 extending from the lower portion of the sump 40. The low temperature separation unit 21 and the arrangements for removing separated gas, hydrocarbons, and water therefrom, is shown and described in detail in the U.S. patent to Jay P. Walker et al. No. 2,747,002.

The low pressure separator 39 is equipped with a float-operated liquid level control 45 for operating a motor valve 46 provided in the hydrocarbon discharge conductor 47 leading from the lower portion of the separator 39 to a point of hydrocarbon storage. There is also provided a gas outlet conductor 48 leading from the separator 39 through a suitable back pressure valve 49.

The steam generator 10 and low temperature separation unit 21 may desirably be mounted upon a common base or platform 50, and the preheater 13 may desirably be mounted upon the upper side of the steam generator 10. In this manner, a unitary and compact structure results, and much of the piping and other connections may be completed prior to actual installation of the unit at a producing well in the field.

In the operation of this form of the invention, the well stream, under high pressure, enters through the conductor 15 and passes through the preheater coils 14 for elevation to a temperature sufficient to avoid the formation of gas hydrates in the well stream prior to the passage thereof through the choke 23, and/or to predetermine the temperature and hydrocarbon composition of the gas leaving the low temperature separator. Steam will be supplied to the preheater enclosure 13 through the conductor 18 in such quantities as necessary to carry out the aforesaid heating, and as the steam condenses in the course of such heating, the condensates will be returned to the steam generator 10 through the conductor 19 and check valve 20. The check valve, as is usual for this type of steam supply, prevents the reverse flow of fluids through the conductor 19 from the steam generator to the preheater enclosure. Of course, in some instances, the preheater 13 may be eliminated entirely, primarily when the well stream enters at such a temperature and pressure that heating thereof to prevent premature hydrate formation is unnecessary and/or when control or variation in the composition of the exiting gas is not desired.

In passing through the choke 23, the well stream undergoes an appreciable pressure reduction and is therefore chilled to a quite marked extent which causes the formation of ice and/or gas hydrates, along with the liquefaction of hydrocarbons and water. By this means, the gaseous portion of the well stream is sufficiently denuded of water and hydrocarbons as to permit its sale to a gas transmission pipe line, and at the same time, quantities of the valuable and salable liquid hydrocarbons are recovered. In the vessel 22, the hydrates and liquid portions of the well stream are separated from the gaseous portion, dehydrated gas being drawn off through the outlet conductor 32 while the liquids settle and stratify in the lower portion of the low temperature separation vessel. It is necessary to supply heat to the lower portion of the vessel 22, at least at intervals, to make provision for melting of any ice and/or gas hydrates which may be present, and this is carried out by the coils 25 which receive steam through the conductor 26 and return condensate to the steam generator 10 through the conductor 27. Through utilization of the temperature controller 29, the valve 31 is opened and closed only sufficiently to maintain the desired temperature within the lower portion of the vessel 22, and accordingly, the very minimum amount of heat necessary for melting of the ice and/or hydrates is employed and excessive heating of the dehydrated gas or the separated distillates is avoided.

The separated water is removed from the sump 40 through the outlet conductor 44, while the separated distillates pass from the sump 34 into the low pressure separator 39, which is operated at a pressure well below that of the vessel 22, but considerably above the pressure of the hydrocarbon storage tanks or stock tanks whereby the full benefits of stage separation are obtained, and substantially only that gas is removed from the distillate in the separator 39 which may not be retained in the separated liquids in the storage or stock tanks. As an example, when processing a well stream having a relatively low hydrocarbon content, and assuming that the vessel 22 is being operated at 1,000 pounds per square inch, along with the inclusion in the system of the low pressure separator 39 operating at a pressure of 75 pounds per square inch at 70° F., an additional recovery of approximately one barrel per million standard cubic feet of gas will be realized over and above the recovery which would be made if the low pressure separator 39 were not utilized. At lower operating temperatures, the increase in recovery is, of course, correspondingly higher. On this basis, the low pressure separator 39 is not essential or necessarily used with the remainder of the system, but in most instances, the increased recovery which is realized through use of the low pressure separator warrants its inclusion in the system.

Basically, the operation of the low temperature separation unit illustrated in FIG. 1 of the drawings is essentially that of the similar units disclosed in the aforesaid U.S. patent to Walker et al. No. 2,747,002, with several very important exceptions. First, disrgarding those instances in which the well stream flows at a temperature high enough to carry out the necessary heating of the lower portion of the low temperature separator for melting of the gas hydrates, the present unit may operate at lower temperatures than units in which the well stream is passed through the heating coils and hence will afford greater recoveries of marketable liquid hydrocarbons due to the enhanced condensation of such hydrocarbons from the well stream. Assuming that the low temperature unit is operating under such conditions of pressure that the water stratum in the lower portion of the separator must be maintained at a temperature of 75° to 80° F., it will be necessary that the largely gaseous well stream leave the heating coils at a temperature of 90° to 100° F. due to the heat exchange conditions between the well stream, the coils, and the liquid in the lower portion of the low temperature separator. Consequently, the well stream will enter the choke 23 at a temperature much higher than the temperature of gas hydrate formation, and this increased temperature will be reflected in the operating temperature of the low temperature separator 21, usually resulting in a temperature of 15° to 20° F. higher than can be obtained with the present invention. Utilizing the present disclosure, however, the temperature of the well stream entering the choke 23 may be maintained at a point just above the temperature of gas hydrate formation, and consequently, the temperature within the separator 21 will be depressed to the degree that will produce maximum liquefaction of hydrocarbons and maximum dehydration of the well stream.

Second, since the lowest possible temperature is achieved in the separator 21, the gaseous portion of the well stream will be denuded of water and hydrocarbons to a maximum degree, thus insuring maximum dehydration and maximum removal of liquid hydrocarbons from the sales gas being withdrawn to a gas transmission pipe line through the gas outlet conductor 32. Further, since at least a portion of the gas being withdrawn from the low pressure separator 39 through the gas outlet pipe 48, and on occasion, a portion of the high pressure gas withdrawn through the outlet 32, is utilized for fuel gas for the fire tube 11 as well as pilot gas for operating the various controls and the motor valves, the increased denuding of this gas of all liquids will minimize freezing problems in the various gas supply and pilot gas lines and assure the operator of more trouble-free performance of the low temperature separation system.

Third, the utilization of steam coils for supplying heat to the lower portion of the low temperature separation unit 21 takes advantage of the high heat transfer coefficient of steam and the high mean temperature differential between the steam coil and the warm water in the lower portion of the vessel 22 in which the steam coil is immersed. This permits the low temperature separation unit 21 to accommodate larger volumes of hydrates, ice, water, and distillate due to the high heating effectiveness of the steam coil, and consequently, the utilization of a high pressure separator or water knockout upstream of the choke 23 is avoided or at least delayed for a maximum period of time. Since the unit can handle larger volumes of liquid and hydrates, it becomes unnecessary to remove a portion of such liquids prior to introduction of the well stream into the low temperature separator, and thus, the expense of installing, maintaining, and operating a high pressure separator or water knockout is avoided. In addition, the unit is capable of handling greater quantities of drilling mud and other foreign material which may be present in the well stream, along with waxes, emulsified distillate, and the like. Here again, the high heat transfer characteristics of the steam coil make these additional advantages possible. Still further, a reduction in the consumption of fuel gas is observed since less gas must be burned to generate sufficient steam to carry out the desired heating functions than would be required to obtain the same amount of heating through warm or hot gas passed through the coils 25. This is true because all of the heat cannot be removed from the heated gas, whereas the steam gives up virtually all of its heat in the form of its latent heat of vaporization, the condensate being returned to the steam generator 10 as a liquid very near or at the boiling point of water. Accordingly, the heat input to the steam generator is almost entirely utilized in the heating coils 25, and consequently, a marked reduction in fuel gas consumption is obtained.

The steam generator unit 10 may be provided with all necessary or desirable controls, the fuel gas supply line 51 having interposed therein, as shown in FIG. 2, a motor valve 52 operated by a steam pressure regulator 53, a motor valve 54 operated by a low water level alarm 55, and such other controls and shutoff valves as may be found desirable such as burner tube temperature shutoff valves and the like. Thus, automatic operation of the steam generator at the desired temperatures and pressures is ensured and the need for manual supervision is eliminated.

As pointed out hereinbefore, the present system lends itself to intermittent operation in which the steam generator is periodically fired for the generation of steam to melt or thaw ice and/or gas hydrates present within the low temperature separator 21 and to otherwise supply at intervals the heating desired for continuous and proper operation of the low temperature separator. Continuous heating is not essential, however, due to the high heating capacity of the steam system and the ability of such system to handle at intervals accumulated heating requirements, possibly in the form of gas hydrates which have accumulated in the vessel 22 over a period of several hours. Provision for such intermittent heating is illustrated in FIG. 2, there being provided a suitable clock or time-controlled mechanism 56 driving a lobed cam 57 which, in turn, operates a flapper valve 58 to open or close an orifice 59. Supply gas under pressure is furnished to the orifice 59 through an orifice 60, and normally escapes through the orifice 59 without creating a back pressure in the branch conductor 61. When, however, one of the lobes 62 of the cam 57 engages the flapper valve 58 to close the orifice 59, a pressure will be built up in the branch conductor 61 and communicated through the pipe 63 to the motor valve 64, opening the latter and supplying the fuel gas to the burner 65 of the fire tube 11 resulting in the generation of steam and the supplying of heat to the coils 25.

Dependent upon the nature of the well stream being handled by the low temperature unit, the time-controlled, intermittent-firing mechanism may be arranged to supply heat for one hour out of each three or four hours, for one hour out of each eight hours of operation, or for such other intervals and durations as may be found necessary or desirable. With such an arrangement, the low temperature separator 21 will be caused to operate at even lower temperatures than would otherwise be obtained since no heat would be supplied thereto for a major portion of its period of operation, and further, the consumption of fuel gas by the steam generator 10 would be reduced to a minimum. Due to the relatively large internal capacity of the vessel 22, proper and efficient low temperature separation may be carried out for extended periods of time without the supplying of any heat to the coils 25, and by reason of the high heating efficiency of the steam system, the vessel 22 may be completely thawed in a relatively short time and then the supply of heat shut off so that the vessel may again operate at a minimum temperature. Of course, the lower the temperatures maintained in the vessel 22, the more complete will be the removal of liquid hydrocarbons and water from the gaseous well stream passing therethrough.

There may also be instances in which approximately continuous supplying of heat to the preheater 13 is required or desirable, and in such instances, the intermittent heating of the low temperature separator 21 may be carried out as shown in FIG. 2 by closing the valve 66 interposed in the line 63 and opening the valve 67 provided in a branch line 68 leading to the motor valve 31 which is provided in the steam supply conductor 26. In such case, the temperature controller 29 may be omitted, or it may be employed in conjunction with the illustrated intermitter structure so as to make available, through the duration of the heating period, upper and/or lower limits for the temperature of the water stratum in the low temperature separator.

The temperature control of the incoming well stream will determine to a large extent the internal temperature of the low temperature separator as well as the temperature of the outgoing gas. Hence, such temperature control may be utilized for determining or varying the hydrocarbon composition of the gas. Natural gas is, of course, predominantly methane and includes small percentages of the higher homologues, ethane, propane, butane, isobutane, and so on up to possibly some hexane and heptane. When a rich outlet gas, possibly for processing in a gasoline plant, or a very stable distillate, or a minimum gas loss from the discharge of distillate, is desired, the inlet well stream may be brought to higher temperatures for production of such results. Conversely, lower inlet temperatures may be employed for producing a gas of optimum leanness or a very light distillate for subsequent processing, for instance, in a stabilizing column. Manifestly, dependent on the inlet stream, the composition of the outlet gas may be varied over a wide range.

Low temperature separation units are commonly operated at or near the pressure of the gas transmission pipe line into which the unit discharges, and are also often supplied with an inlet well stream at or near well head pressure. Of course, the pressure of the well stream may be reduced at the well head, but because of hydrate formation and other reasons such pressure reduction is not often carried out so that in many cases, the pressure drop across the low temperature unit is more or less set by the well head and pipe line pressures. For this reason, the temperature drop in the well stream is also necessarily set along with the temperature, and therefore the general composition, of the outlet gas.

By being able to vary the inlet temperature of the well stream independently of the temperature in the bottom of the low temperature separator, however, the outlet temperature, and hence the composition, of the outlet gas may be controlled. Thus, by temperature control, a gas free of butanes may be withdrawn, or a gas containing substantially all the butanes in the well stream, within the capacity of the low temperature separator to make such separations. Similarly, the water content of the outlet gas may be controlled to a marked degree, or the presence of other components in the gas.

A more detailed illustration of the invention is shown in FIGS. 3 through 7 wherein the same numerals have been employed to identify the same parts insofar as they substantially correspond. Necessarily, the illustration of FIG. 1 is diagrammatic in nature for puropses of clarity, and the actual structural appearances of the various elements vary to some degree. It is noted, however, that the structures are essentially the same and function in the same manner.

In this more detailed illustration of the invention, the steam generator 10 and low temperature separator 21 are mounted upon the base or skid 50, the preheater 13 being mounted on the upper surface of the steam generator 10. The well stream is admitted to the coil 14 of the preheater through the inlet conductor 15 and passes therefrom through the conductor 16 to the choke or other pressure reducing means 23. There is incorporated in the conductor 16 a temperature sensing fitting 69 having connected thereto a temperature controller 70 with a pilot gas supply conductor 71 leading thereto. The temperature controller 70 admits and excludes pilot gas from an outlet conductor 72 leading to a motor valve 73 connected into the steam conductor 18 leading from the steam generator 10 to the preheater 13.

For purposes of convenience, it has been found desirable to utilize a float 74, as shown in FIG. 5, as a low water level alarm and to extend the steam conductor 18 from the upper portion of the mounting collar 75 for the float 74 to a T 76 opening downwardly through the upper side of the preheater 13 and upwardly to a safety relief valve 77. The float 74, of course, operates the control unit 78 which, in turn, operates the shutoff valve 54 for closing off the supply of fuel gas to the burner 65 of the fire tube 11.

Returning to the temperature controller 70, by the sensing of the temperature of the well stream flowing to the choke 23, the controller 70 may be properly set to open and close the valve 73 so as to maintain the temperature of the well stream entering the choke 23 only slightly above the point of expected gas hydrate formation, and accordingly, the well stream will be introduced into the low temperature separation unit 21 at the lowest possible temperature for maximum dehydration of the gas and maximum recovery of liquid hydrocarbons. Also, the controller 70 may be set to maintain the well stream temperature at a predetermined value which will produce gas from the low temperature separator with a predetermined or desired hydrocarbon composition.

The utilization of a separately controlled heating coil in the low temperature separation unit makes possible this rather close control of the temperature of the incoming gas stream whereas otherwise, the well stream might necessarily acquire a somewhat higher or lower heat content than desired to accomplish the selected ends. Of course, the occurrence of gas hydrates upstream of the choke may be due to the flow of cold from the choke upstream through the walls of the conductor 16, or to other causes, but in any event, provision for the control of such hydrate formation and/or outlet gas composition has been made.

As previously described, the well stream, at minimum or a desired temperature, passes through the choke 23 into the interior of the unit 21 and therein undergoes low temperature separation in accordance with established principles. Steam for heating the lower portion of the unit 21 is supplied from the generator 10 through the conductor 26 and valve 31 to the coil 25, any condensed steam being returned through the conductor 27 and check valve 28 to the lower portion of the steam generator. The temperature sensing probe 30 may, of course, be positioned at any desired spot or location within the unit 21, it being shown in FIGS. 3 and 4 as extending directly from the temperature controller 29 through the side wall of the vessel and being operatively connected to the motor unit of the valve 31 through the pilot gas conductor 79.

A small liquid separator 80 is provided upon the base or skid 50 for receiving pilot gas from a suitable source of supply and furnishing dry clean gas through the outlet conductor 81 to the manifold 82. The latter extends in turn to the supply conductor 83 for the temperature controller 29, the supply conductor 84 for the distillate level control unit 36, the supply conductor 85 for the water level control unit 42 and the supply conductor 86 for the control unit 45 regulating the liquid level control in the low pressure separator. In turn, the control unit 36 has a pilot gas outlet conductor 87 leading to the motor valve 37 for discharging distillate from the low temperature separator to the low pressure separator, the control unit 42 is provided with a pilot gas outlet conductor 88 extending to the water discharge valve 43, and the control unit 45 has pilot gas outlet conductor 89 leading to the distillate discharge valve 46.

The manifold 82 also extends to and is connected with the fuel gas supply conductor 51 from which fuel gas is supplied to the burner 65 through the valves 52 and 54, and pilot burner fuel gas is taken off from the conductor 51 through the conductor 90.

As pointed out hereinbefore, the low temperature unit as illustrated in FIGS. 3, 4, 5 and 6 is essentially the same as the low temperature unit illustrated in FIG. 1 but differs in a few details in that the separator vessel 22' is somewhat elongated and carries a heavy transverse partition 91 adjacent one end portion of the vessel for enclosing the low pressure separator 39' which, although forming a part of the vessel 22', is a separate enclosure. The distillate overflow sump 34' and water overflow sump 40' are substantially the same as those previously described, the major change between the two vessels being the enclosure of the low temperature separator and the low pressure separator within a single elongate vessel rather than the utilization of two separate vessels for carrying out the two separation steps. An inlet fitting 92 is provided in the inlet end of the low temperature separation unit, but normally is not employed in this system until such time that a high pressure separator or water knockout is incorporated into the system upstream of the preheater 13. When this addition is made, the liquid discharge conductor from the high pressure separator may desirably be connected into the inlet fitting 92 to avoid the passage of separated liquids through the choke 23.

A somewhat more compact form of the invention is illustrated in FIG. 8 in which an elongate horizontal low temperature separation vessel 93 has one end carried upon an upright support 94 and its opposite end carried on the upper end of a small, low pressure vertical separator 95 having a depending base or support 96 extending downwardly to the platform or skid mounting 97 upon which the lower end of the standard 94 is also carried. The steam generator 98 is also mounted on the support 94 and encloses a fire tube 99 and a preheat coil 100. The generator, of course, is partially filled with a volume of fresh water 101, the steam coil 100 being disposed in the steam or vapor space of the generator, while a steam outlet 102 leads through a motor valve 103 into the heating coil 104 positioned in the lower portion of the vessel 93 above the steam generator and having a condensate line 105 returning to the lower portion of the generator.

The well stream inlet 106 is connected through a three-way valve 107 with the inlet and outlet of the preheater coil 100 and with the well stream conductor 108 leading to the choke 109 and diverter inlet structure 110 disposed within the upper portion of the vessel 93 and adjacent one end thereof. A gas outlet 111 is provided in the upper portion of the vessel 93, and distillate and water overflow sumps 112 and 113, respectively, are provided in the opposite end of the low temperature vessel. The distillate sump 112 has a drain conductor 114 leading through a diaphragm-operated or motor valve 115 to an inlet diverter 116 positioned interiorly of the low pressure separator 95, while the water overflow sump 113 has a water outlet conductor 117 leading through a motor valve 118 to a suitable point of water disposal. The low pressure separator has a gas discharge conductor 119 extending through a back pressure valve 120, and a hydrocarbon or distillate discharge conductor 121 through which flow is controlled by a motor valve 122.

The three-way valve 107 is operated by a temperature controller 123 arranged to respond to the temperature of the fluid passing through the conductor 108 and to shift the valve 107 so as to pass a portion or all of the well stream through the preheater coil 100, or to exclude the well stream from such coil, in order to maintain the well stream at the inlet to the choke 109 at a temperature only slightly above the point of expected gas hydrate formation or at a temperature which will control hydrate formation and/or outlet gas composition. Similarly, the valve 103 is operated by a temperature controller 124 which responds to a temperature probe 125 positioned in the water stratum in the lower portion of the vessel 93 and functioning to maintain said water stratum at a desired or predetermined temperature which will control hydrates in the vessel 93. The distillate overflow sump 112 receives a float 126 which operates a pilot valve or controller 127 which, in turn, operates the valve 115 to drain distillate from the sump into the low pressure separator 95 in accordance with its rate of accumulation.

Similarly, the sump 113 receives a float 128 operating a controller 129 for opening and closing the valve 118 and discharging water from the water overflow sump. A float 130 is positioned within the low pressure separator 95 for operating a pilot valve 131 and, in turn, operating the valve 122 for discharge of separated distillate from the low pressure separator storage tanks or other point of disposition.

In some instances, it may be desirable or necessary to provide means for heating the choke, or other expansion means as employed in the various forms of the invention, and such means is illustrated in FIG. 8 of the drawings in which the choke 109 is partially or completely enclosed by the steam jacket 132 having a steam supply conductor 133 extending thereto from the lower portion of the supply conductor 102. A condensate return conductor 134 leads from the jacket 132 to the condensate return conductor 105.

For regulating the heating of the choke, a control valve 135 is inserted in the conductor 133 and operated by a temperature controller 136 having a temperature sensing probe 137 responsive to the temperature in the jacket 132 or to the temperature of the walls of the choke 109. Here again, a single source of heating medium, such as the steam generator, is employed for supplying heating under separately and independently controlled conditions to a particular element in the low temperature separation system which may require such heating. The heating of the choke is readily carried out from the same source of heating medium but is controlled entirely separately from the preheating of the well stream as well as separately from the heating of the lower portion of the low temperature separation vessel.

In all principal respects, this last described form of the invention possesses all of the advantages and benefits, and operates in substantially the same manner as the previously described forms, but includes the additional advantages of an extremely compact structure. Further, the separate preheater enclosure is eliminated and the vapor space of the low pressure steam generator is utilized for reception of the preheater coil 100.

It is manifest that all forms of the invention may be modified to receive the intermittent heating controller illustrated in FIG. 2, it being noted in each instance that the controller may either open and close a motor valve controlling the supply of fuel gas to the fire tube burner, or may operate separately in conjunction with the temperature controller 29 or 124 for controlling steam supply to the heating coils 25 or 104 so that separate control of the preheater coil in its degree of heating of the incoming well stream may be carried out as found necessary or desirable. In all respects, each form of the invention provides for operation of the low temperature separation unit at minimum temperatures to provide maximum dehydration of the well stream and maximum recovery of marketable liquid hydrocarbons, the preheater coil making provisions for well streams which tend to form gas hydrates prior to entry into the choke or other pressure reducing element, while the low pressure separator may be included for further stabilization of the recovered distillate and greater recoveries of such distillate.

Further, each form of the invention provides for operation of the low temperature separation unit at a temperature which will produce a desired hydrocarbon composition for the dehydrated gas and will control hydrate formation prior to entry of the well stream into the choke or other pressure-reducing means.

It is further noted that any or all of the vessels or enclosures forming components of this system may be of either the horizontal or vertical type. It is also to be noted that in each modification of the invention, the heating coils in the low temperature separator are at an elevation above the steam generator, or at least above the water level in the generator. Hence, the coils are always maintained free of water, and in the event of burner failure or prolonged shutting down of the burner due, for instance, to a low water level, possible freezing and rupturing of the heating coils within the relatively high pressure enclosure of the low temperature separator is avoided. Although of less consequence, the preheater is also above the steam generator in some of the forms of the invention.

In some cases, other heating mediums than steam may be employed such as glycols, oils, high boiling point organic heat exchange materials, and the like.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. The method of low temperature separation of high pressure predominantly gaseous well streams including, chilling the well stream by passing the stream through a pressure reduction step and into a low temperature separation zone wherein the well stream separates and stratifies into a gaseous stratum and cold water and hydrocarbon strata, withdrawing gas from the separation zone, withdrawing water and hydrocarbons from the separation zone, intermittently heating at least the water stratum for periods of time of shorter duration, and terminating said heating for periods of time of longer duration alternately with said periods of heating.

2. The method of low temperature separation of high pressure predominantly gaseous well streams including, chilling the well stream by passing the stream through a pressure reduction step and into a low temperature separation zone wherein the well stream separates and stratifies into a gaseous stratum and cold water and hydrocarbon strata, withdrawing gas from the separation zone, withdrawing water and hydrocarbons from the separation zone, intermittently heating at least the water stratum with steam for periods of time of shorter duration, and terminating said heating for periods of time of longer duration alternately with said periods of heating.

3. The method of low temperature separation of high pressure predominantly gaseous well streams including, chilling the well stream by passing the stream through a pressure reduction step and into a low temperature separation zone wherein the well stream separates and stratifies into a gaseous stratum and cold water and hydrocarbon strata, withdrawing gas from the separation zone, withdrawing water and hydrocarbons from the separation zone, heating at least the water stratum at timed intervals for periods of time of short duration, and terminating said heating for periods of time of longer duration alternately with said periods of heating to cause the water stratum to chill to a maximum degree to cause maximum liquefaction of hydrocarbons from the well stream.

4. The method of low temperature separation of high pressure predominantly gaseous well streams including, chilling the well stream by passing the stream through a pressure reduction step and into a low temperature separation zone wherein the well stream separates and stratifies into a gaseous stratum and cold water and hydrocarbon strata, withdrawing gas from the separation zone, withdrawing water and hydrocarbons from the separation zone, and intermittently heating at least the water stratum with steam while continuously withdrawing all condensed steam in the form of water from the water stratum heating zone.

5. The method of low temperature separation of high pressure predominantly gaseous well streams including, preheating the well stream with a first portion of heating medium from a single source of heating medium, chilling the well stream by passing the stream through a pressure reduction step and into a low temperature separation zone wherein the well stream separates and stratifies into a gaseous stratum and cold water and hydrocarbon strata, withdrawing gas from the separation zone, withdrawing water and hydrocarbons from the separation zone, heating at least the water stratum with a second portion of heating medium from the single source of heating medium for timed intervals, terminating said heating of the water stratum for periods of time alternately with said intervals of heating for bringing the temperature of the water stratum down to a level to cause maximum liquefaction of hydrocarbons from the well stream, and separately and independently controlling the supplying of the heating medium to the preheating and heating steps.

6. The method of claim 5 in which the supplying of the heating medium to the preheating step is controlled to produce gas from the separation zone having a predetermined level of hydrocarbons heavier than methane.

7. A low temperature separation system for high pressure predominantly gaseous well streams including, a hot fluid generator, a low temperature separator, a well stream inlet conductor to the separator, means in the inlet conductor for causing the well stream to undergo a pressure reduction to chill the well stream, a gas outlet from the separator, means for withdrawing water and hydrocarbons from the separator, hot fluid heated means in the separator for heating the lower portion of the separator, and means for supplying hot fluid from the generator to the hot fluid heated means at spaced intervals of time.

8. A low temperature separation system for high pressure predominantly gaseous well streams including, a low pressure steam generator, a low temperature separator, a well stream inlet conductor to the separator, means in the inlet conductor for causing the well stream to undergo a pressure reduction to chill the well stream, a gas outlet from the separator, means for withdrawing water and hydrocarbons from the separator, steam heated means in the separator for heating the lower portion of the separator, and means for supplying steam from the generator to the steam heated means at intervals spaced apart by predetermined periods of time.

9. A low temperature separation system for high pressure predominantly gaseous well streams including, a low pressure steam generator adapted to contain a body of water at a predetermined level, a low temperature separator, a well stream inlet conductor to the separator, means in the inlet conductor for causing the well stream to undergo a pressure reduction to chill the well stream, a gas outlet from the separator, means for withdrawing water and hydrocarbons from the separator, steam conducting means for heating the lower portion of the separator, said steam-conducting means being disposed at an elevation above the predetermined water level in the generator, and means for supplying steam from the generator to the steam-conducting means.

10. A low temperature separation system for high pressure predominantly gaseous well streams including, a steam generator, preheater, a low temperature separator, a well stream inlet conductor extending through the preheater to the separator, means in the inlet conductor for causing the well stream to undergo a pressure reduction to chill the well stream, a gas outlet from the separator, means for withdrawing water and hydrocarbons from the separator, a steam-conducting means for heating the lower portion of the separator, means for supplying steam from the generator to the preheater and the steam-conducting means, means for independently controlling the supplying of steam to the preheater, and means for independently supplying steam from the generator to the steam-conducting means at spaced intervals of time.

11. A low temperature separation system for high pressure predominantly gaseous well streams including, a steam generator, a low temperature separator, a well stream inlet conductor to the separator, means in the inlet conductor for causing the well stream to undergo a pressure reduction to chill the well stream, a gas outlet from the separator, means for withdrawing water and hydrocarbons from the separator, steam heated means in the separator for heating the lower portion of the separator, and means for maintaining the low temperature separator at such low temperature as will afford maximum liquefaction of liquids from the well stream by supplying steam from the generator to the steam heated means at spaced intervals of time.

*12. A method of producing a high pressure, predominantly gaseous, hydrocarbon well stream including,*

*employing a single source of heat to raise the temperature of the gaseous portion and the liquid portion of the entire well stream as desired to control the subsequent composition of the gaseous portion of the well stream when the pressure of the entire well stream is subsequently reduced,*

*reducing the pressure of the entire well stream,*

*separating the well stream at the reduced pressure into a gaseous portion and a liquid portion,*

*directing heat of the single source into only the separated liquid as desired and independent of the heating of the entire well stream, to control the temperature of the separated liquid,*

*and removing the gaseous portion.*

*13. A method of producing a predominantly gaseous hydrocarbon high pressure well stream including,*

*heating a reservoir of heat exchange fluid,*

*controlling indirect heat exchange between the well stream and reservoir fluid as desired to elevate the well stream temperature high enough to control the composition of the gaseous portion of the well stream when the pressure of the well stream is subsequently reduced,*

*reducing the high pressure of the well stream,*

*introducing the well stream at reduced pressure into a separator vessel having the capacity which will provide for separation of the stream into a gaseous portion and a liquid portion,*

*removing the gaseous portion of the well stream from the separator vessel to a pipe line,*

*and passing a regulated portion of the heated fluid of the reservoir in indirect heat exchange which is restricted to the separated liquid portion in the lower portion of the separator vessel,*

*whereby the heating restricted to the separated liquid portion controls the temperature of the liquid portion while the composition of the gaseous portion is controlled before the gaseous portion is removed from the separator vessel.*

*14. A system for producing a predominantly gaseous hydrocarbon high pressure well stream including,*

*a reservoir of heat exchange fluid,*

*a heater for the fluid of the reservoir,*

*an inlet conduit for the well stream,*

*means for indirectly heat exchanging the inlet conduit for the well stream with the heat exchange fluid of the reservoir to elevate the well stream temperature as desired to control the composition of the gaseous portion of the well stream when the pressure of the of the well stream is subsequently reduced,*

*a choke in the inlet conduit,*

*means for flowing the high pressure well stream through the choke to reduce the pressure of the well stream,*

*a vessel connected to the inlet conduit downstream of the choke,*

*means to introduce the well stream at reduced pressure into the vessel, the vessel having the capacity to separate the gaseous portion of the well stream from the liquid portion,*

*an outlet conduit from the vessel through which the gaseous portion of the well stream is removed,*

*and a conductor connected to the fluid reservoir and controlled in heat exchange relation with the lower portion of the vessel to regulate at least a portion of the reservoir fluid in indirect heat exchange which is restricted to the separated liquid portion within the vessel,*

*whereby the temperature of the separated liquid portion is elevated as desired to prevent freezing while the composition of the gaseous portion is controlled before removal from the vessel.*

*15. A method of producing a predominantly gaseous hydrocarbon high pressure well stream including,*

*heating a reservoir of heat exchange fluid,*

*controlling the indirect heat exchange between the well stream and reservoir fluid to elevate the well stream temperature the amount which will control the composition of the gaseous portion of the well stream as desired when the pressure of the well stream is subsequently reduced,*

*reducing the high pressure of the well stream,*

*introducing the well stream at reduced pressure into a separator vessel having the capacity which will provide for separation of the stream into a gaseous portion and a liquid portion,*

*removing the gaseous portion of the well stream from the separator vessel,*

*passing a regulated portion of the heated fluid of the reservoir in indirect heat exchange which is restricted to the separated liquid portion in the lower portion of the separator vessel,*

*whereby the heating restricted to the separated liquid portion controls the temperature of the liquid portion while the composition of the gaseous portion is controlled before the gaseous portion is removed from the separator vessel,*

*sensing the temperature of the separated liquid portion of the stream in the saparator vessel,*

*and regulating the portion of the heated fluid in the indirect heat exchange under the direction of the temperature of the heated liquid portion of the well stream.*

*16. A system for producing a predominantly gaseous hydrocarbon high pressure well stream including,*

*a reservoir of heat exchange fluid,*

*a heater for the fluid of the reservoir,*

*an inlet conduit from the well for the well stream controlled in indirect heat exchange with the heat exchange fluid of the reservoir to elevate the well stream temperature the amount which will control the composition of the gaseous portion of the well stream as desired when the pressure of the well stream is subsequently reduced,*

*a choke in the inlet conduit through which the high pressure of the well stream is reduced,*

*a vessel connected to the inlet conduit downstream of the choke to receive the well stream at reduced pressure and provide the capacity which will separate the gaseous portion of the well stream from the liquid portion,*

*an outlet conduit from the vessel through which the gaseous portion of the well stream is removed,*

*a conductor connected to the fluid reservoir and controlled in heat exchange relation with the lower portion of the vessel to flow at least a portion of the reservoir fluid in indirect heat exchange with only the separated liquid portion,*

*whereby the temperature of the separated liquid portion is elevated high enough to prevent freezing separated liquid while the composition of the gaseous portion is controlled before removal from the vessel,*

*a valve in the conductor,*

*and means sensing the temperature of the separated liquid portion of the well stream and arranged to*

*control the valve in the conductor to regulate the reservoir fluid flow so freezing of separated liquid will be prevented.*

References Cited by the Examiner

The following references, cited by the Examiner, are of record in the patented file of this patent or the original patent.

UNITED STATES PATENTS

| | | | |
|---|---|---|---|
| 2,259,877 | 10/41 | Cary | 236—46 |
| 2,531,593 | 11/50 | Zeitlin | 236—46 |
| 2,690,814 | 10/54 | Reid. | |
| 2,728,406 | 12/55 | Maher | 55—175 X |
| 2,747,002 | 5/56 | Walker et al. | 55—57 X |
| 2,758,665 | 8/56 | Francis. | |
| 2,768,118 | 10/56 | Laurence et al. | |
| 2,786,543 | 3/57 | Hayes et al. | |
| 2,866,834 | 12/58 | Donnelly. | |
| 2,873,814 | 2/59 | Maher. | |
| 2,928,885 | 3/60 | Newsome. | |

OTHER REFERENCES

Petroleum Refiner, vol. 32, No. 1, January 1953, pp. 138–142.

REUBEN FREIDMAN, *Primary Examiner.*

NORMAN YUDKOFF, *Examiner.*